March 25, 1941.      T. B. ALLARDICE      2,236,358
COMBINED CINDER COLLECTOR AND FLUID HEATER
Filed Nov. 29, 1939      2 Sheets-Sheet 2

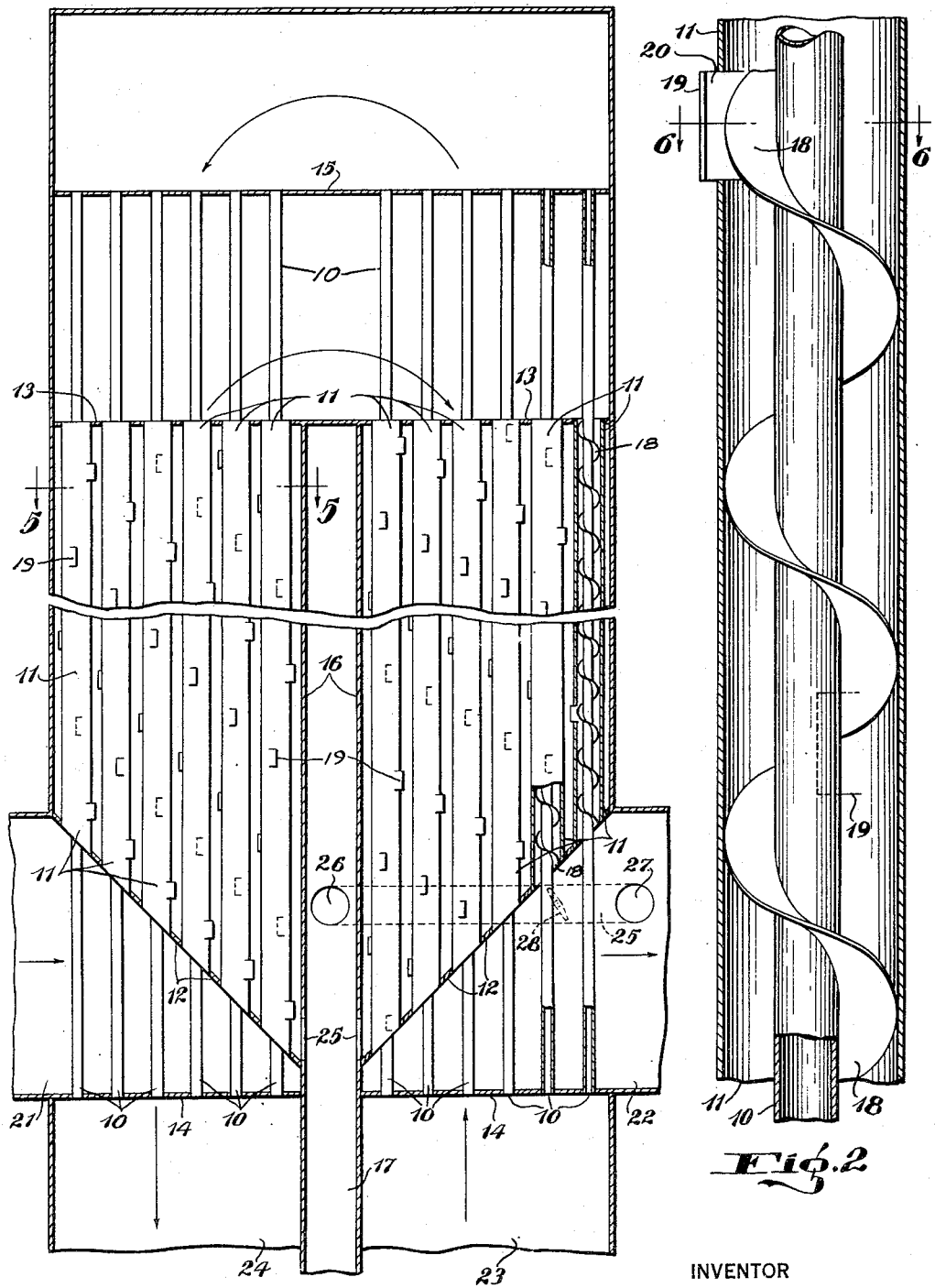

INVENTOR
*Thomas B. Allardice*
BY *Robert J. Palmer*
ATTORNEY

Patented Mar. 25, 1941

2,236,358

UNITED STATES PATENT OFFICE 2,236,358

COMBINED CINDER COLLECTOR AND FLUID HEATER

Thomas B. Allardice, Mountain Lakes, N. J.

Application November 29, 1939, Serial No. 306,629

13 Claims. (Cl. 183—32)

This invention relates to combined cinder or dust collectors and fluid heaters, and relates more particularly to apparatus for collecting solid matter from flue gases from, for example, steam power plants, and for extracting heat from the flue gases, and for utilizing the extracted heat for heating air or water.

An object of the invention is to flow the fluid to be heated through tubes and to flow the heated gases in spiral paths around the tubes.

Another object of the invention is to provide an efficient collector in which the solid particles are thrown out of the flue gases by centrifugal force.

Another object of the invention is to provide an efficient, compact, cinder collector and fluid heater.

The invention will now be described with reference to the drawings, of which:

Fig. 1 is a side elevational view, in cross-section of a combined cinder collector and fluid heater embodying this invention;

Fig. 2 is an enlarged sectional view of one of the heat exchange and cinder separating tube assemblies of Fig. 1;

Figure 5:
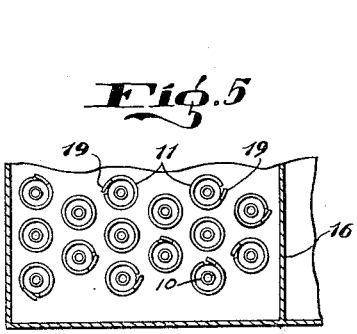
Fig. 5 is a partial section taken along the lines 5—5 of Fig. 1.

Referring first to Figs. 1, 2 and 5, which illustrate a combined cinder collector and fluid heater of the vertical flow type, the inner tubes 10 which are adapted to receive the fluid to be heated, extend centrally through the outer tubes 11 which in turn, are adapted to receive the heated flue gases.

The outer tubes 11 terminate at their lower ends in the V-shaped floor 12 of the collector, which is apertured to receive the tubes 11. The upper ends of the tubes 11 terminate in the horizontal wall 13 which is apertured to receive them.

The inner tubes 10 extend above and below the tubes 11. Their lower ends terminate in the lower wall 14 which is apertured to receive them, and their upper ends terminate in the upper wall 15 which is apertured to receive them.

The tubes 10 and 11 are divided into two groups by the inner walls 16 which extend from the horizontal wall 13, through the floor 12 and lower wall 14 and which are spaced apart to form the cinder hopper 17 in their lower portions.

As shown most clearly by Fig. 2, each tube 10 has wound spirally around it in that portion of the tube which is contained within its respective outer tube 11, the metal strip 18, the inner edges of which contact the tubes 10, and the outer edges of which contact the inner surfaces of the tubes 11. At spaced intervals, the walls 10 of the tubes 11 are cut and spread at 19 to form the slits 20.

The heated flue gases from the gas inlet 21 pass in contact with the lower ends of the tubes 10 which are placed to the left (facing Fig. 1 of the drawings) of the walls 16, then enter the lower ends of the tubes 11, which surround the last mentioned tubes 10.

The flue gases leaving the upper ends of the last mentioned tubes 11 pass in contact with the upper ends of the tubes 10 and then enter the upper ends of the tubes 11 which are arranged to the right of the walls 16. The flue gases then descend within the last mentioned tubes 11 and pass out their lower ends in contact with the lower ends of the tubes 10 which are arranged to the right of the walls 16, and then out the gas exit 22.

The fluid to be heated flows through the fluid inlet 23 into the lower ends of the tubes 10 to the right of the walls 16, passes out their upper ends into the upper ends of the tubes 10 to the left of the walls 16 and then out their lower ends into the fluid exit 24. This counter-current flow of the fluid and the gas with the coldest fluid passing in heat exchange contact with the coldest gas, provides maximum efficiency.

The strips 18 within the tubes 11 cause the flue gases to pass spirally within the tubes 11 and around the tubes 10. This provides increased contact time and conformably increased heat transfer from the gases to the fluid flowing through the tubes 10.

The cinders and dust, etc., in the flue gases due to their spiral path are forced by centrifugal force against the inner surfaces of the tubes 11 and at the slots 20 are thrown out the tubes 11 into the space surrounding them. The solid matter thus thrown out of the tubes 11 falls upon the converging walls of the floor 12, slides down the sloped walls and passes through the openings 25 in the walls 16 at the apex of the V-shaped floor 12, into the cinder hopper 17.

The cinder hopper 17 is, of course, normally closed at its lower end for permitting the accumulation of cinders which may be removed at intervals. The space within the hopper 17 is connected by the tube 25, shown in dotted outline by Fig. 1, with the gas exit 22. The inlet 26 of the tube 25 is in the hopper space and its outlet 27 is in the gas exit 22. The damper 28 in the tube regulates the pressure in the hopper. With the dampers 28 closed, the space within the hopper is dead so that no circulation can take place therein and no gas can leave the slots 20 in the tubes 11 to enter the hopper space. With the damper moved towards open position, gas circulation through the hopper is permitted to aid in ejection of the solid matter from the slots 20 in the tubes 11.

Figure 3:
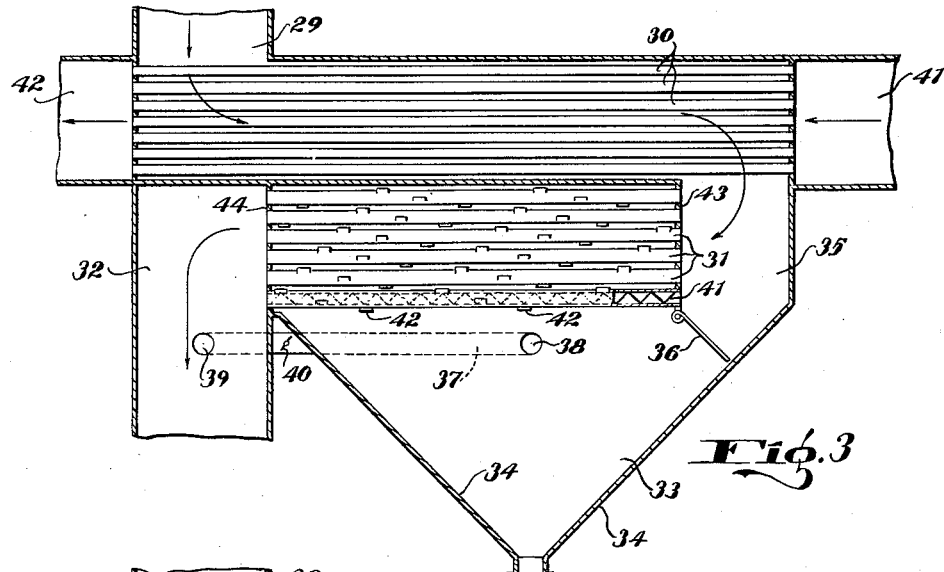
Fig. 3 is a side elevational view, in cross-section, of another form of cinder collector and fluid heater embodying this invention.

In the embodiment illustrated by Fig. 3, the fluid heater section and the collector section are separate and the tubes are arranged horizontally. The flue gases enter through the gas inlet 29, pass over the exterior of the fluid heater tubes 30, and then turn through an angle of 180° to pass through the collector tubes 31. The gases leaving the tubes 31 turn through an angle of 90° into the gas exit 32.

The fluid to be heated enters the tubes 30 from the fluid inlet 41 and after passing through the tubes 30, departs through the fluid exit 42.

The hopper 33 has the converging walls 34 extending below the tubes 30 and 31. The hopper 33 has a portion 35 connecting with the gas at the entrance to the tubes 31, with adjustable damper 36 for permitting a portion of the gas to pass through the tubes 31 or into the hopper.

The tube 37 with inlet 38 in the hopper 33 and outlet 39 in the gas exit 32 permits circulation controllable by the damper 40, of gas through the hopper.

Figure 6:
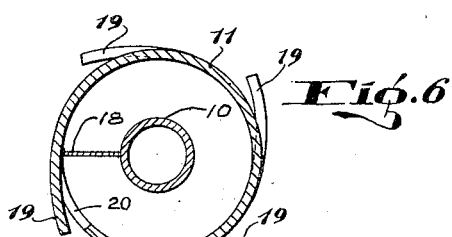
Fig. 6 is a sectional view along the lines 6—6 of Fig. 2.

The collector tubes 31 contain spirally wound strips 41 similar to the strips 18 of Figs. 1 and 2 except that no inner tubes pass therethrough and serve to cause the gases passing through the tubes 31 to move spirally through the tubes and the solid matter carried thereby to be thrown by centrifugal force against the inner surfaces of the tubes 31. The walls of the tubes 31 have the spaced, cut, extruded portions 42 which provide slots similar to the slots 20 of Figs. 2 and 6 and which permit exit of the solid matter thrown out by centrifugal force from the tubes 31.

The tube sheet 43 extends vertically and encloses the inlet ends of the tubes 31 and the similar tube sheet 44 encloses the outlet ends of the tubes 31.

Figure 4:
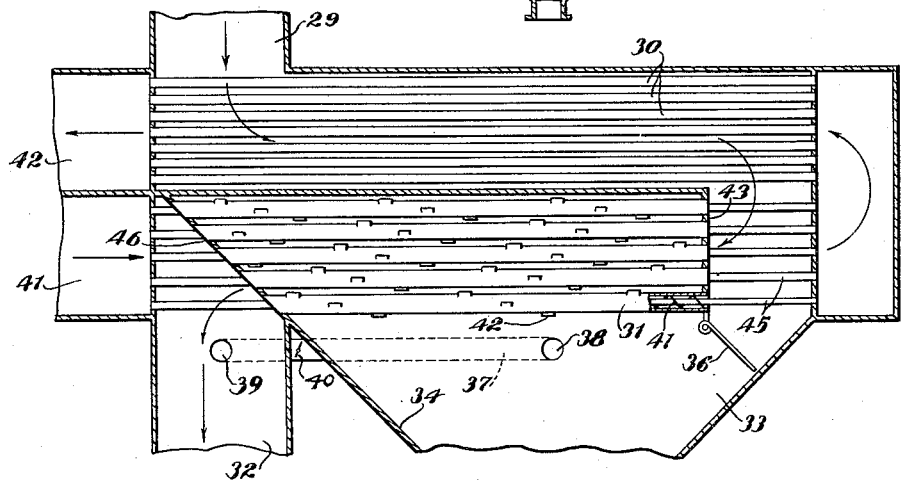
Fig. 4 is a side elevational view, in cross-section, of another form of cinder collector and fluid heater embodying this invention.

The embodiment illustrated by Fig. 4, is similar to that illustrated by Fig. 3 except that the collector tubes also contain fluid heating tubes, the fluid to be heated flows in two passes, and the tube sheet enclosing the exit ends of the collector tubes forms an extension of one of the converging walls of the hopper instead of extending vertically. Accordingly, similar structure in Figs. 3 and 4 is provided with the same reference characters.

In the embodiment of Fig. 4, the collector tubes 31 contain additional fluid heating tubes 45 around which the spiral strips 41 are wound, and the gas leaving the fluid heating tubes 30 passes over and around the additional fluid heating tubes 45.

The fluid inlet 41 is arranged at the entrance of the additional fluid heater tubes 45, and the fluid leaving the tubes 45 makes a 180° turn and enters the inlet ends of the tubes 30.

The tube sheet 46 enclosing the outlet ends of the tubes 31 forms an extension of the enclosed left hand wall 34 (facing Fig. 4 of the drawings) and deflects as do the walls 34, solid matter thrown out from the tubes 31, into the hopper 33.

While embodiments of the invention have been described for the purpose of illustration, it should be understood that the invention is not limited to the exact apparatus and arrangements of apparatus illustrated, as departures therefrom may be suggested by those skilled in the art without departure from the essence of the invention.

What is claimed is:

1. A combined fluid heater and cinder collector, comprising a plurality of inner tubes, a plurality of larger outer tubes arranged substantially concentrically around said inner tubes, metal strips wound spirally around said inner tubes, means for flowing a fluid to be heated through said inner tubes, means for flowing heated gases through said outer tubes, the walls of said outer tubes having openings formed therein for the ejection of cinders thrown out by the centrifugal force resulting from the gas flow around said strips, and a cinder hopper below said outer tubes for receiving the cinders.

2. A combined fluid heater and cinder collector, comprising a plurality of inner tubes, a plurality of larger outer tubes arranged substantially concentrically around said inner tubes, metal strips wound spirally around said inner tubes, means for flowing a fluid to be heated through said inner tubes, means forming a heated gas inlet passage into said outer tubes, means forming a gas outlet passage from said outer tubes, the walls of said outer tubes having openings formed therein for the ejection of cinders thrown out by the centrifugal force resulting from the gas flow around said strips, a cinder hopper below said outer tubes for receiving the cinders, means forming a gas circulation passage connecting the interior of said hopper and said outlet passage, and a damper in said circulation passage for varying the circulation of gas through said hopper.

3. A combined fluid heater and cinder collector comprising a plurality of inner tubes, a plurality of larger outer tubes arranged substantially concentrically around portions of said inner tubes, means for flowing a fluid to be heated through said inner tubes, means forming gas inlet passages into, and gas outlet passages from, said outer tubes, said outer tubes having ends terminating in inner walls of said passages, said inner tubes having portions extending through said walls and cross-wise said passages, metal strips wound spirally around said portions of said inner tubes within said outer tubes, the walls of said outer tubes having openings formed therein for the ejection of cinders thrown out by the centrifugal force resulting from the gas flow around said strips, and a cinder hopper below said outer tubes.

4. A combined fluid heater and cinder collector comprising a plurality of inner tubes, a plurality of larger outer tubes arranged substantially concentrically around portions of said inner tubes, means for flowing a fluid to be heated through said inner tubes, means forming gas inlet passages into, and gas outlet passages from, said outer tubes, said outer tubes having ends terminating in inner walls of said passages, said inner tubes having portions extending through said walls and cross-wise said passages, metal strips wound spirally around said portions of said inner tubes within said outer tubes, the walls of said outer tubes having openings formed therein for the ejection of cinders thrown out by the centrifugal force resulting from the gas flow around said strips, and a cinder hopper having converging walls below said outer tubes, one of said inner walls forming an extension of one of said converging walls.

5. A combined fluid heater and cinder collector comprising a plurality of inner tubes, a plurality of larger outer tubes arranged substantially concentrically around portions of said inner tubes, means for flowing a fluid to be heated through said inner tubes, means forming gas inlet passages into, and gas outlet passages from, said outer tubes, said outer tubes having ends terminating in inner walls of said passages, said inner tubes having portions extending through said walls and cross-wise said passages, metal strips wound spirally around said portions of said inner tubes within said outer tubes, the walls of said outer tubes having openings formed therein for the ejection of cinders thrown out by the centrifugal force resulting from the gas flow around said strips, and a cinder hopper having converging walls below said outer tubes, said inner wall of said gas inlet passage forming an extension of one of said converging walls.

6. A combined fluid heater and cinder collector comprising a plurality of inner tubes, a plurality of larger outer tubes arranged substantially concentrically around portions of said inner tubes, means for flowing a fluid to be heated through said inner tubes, means including converging inner walls forming gas inlet passages into, and gas outlet passages from, said outer tubes, said outer tubes having ends terminating in said converging walls, said inner tubes having portions extending through said walls and cross-wise said passages, metal strips wound spirally around said portions of said inner tubes within said outer tubes, the walls of said outer tubes having openings formed therein for the ejection of cinders thrown out by the centrifugal force resulting from the gas flow around said strips, and a cinder hopper having converging walls forming extensions of said first mentioned converging walls below said tubes.

7. A combined fluid heater and cinder collector, comprising a plurality of substantially vertical outer tubes, spaced substantially vertical walls dividing said tubes into two groups, a pair of converging walls, one enclosing the lower ends of the tubes of one of said groups and the other enclosing the ends of the tubes of the other of said groups, substantially smaller inner tubes arranged substantially concentrically within said outer tubes, metal strips wound spirally around said inner tubes, means for flowing a fluid to be heated through said inner tubes, and means for flowing heated gases through said outer tubes, the walls of said outer tubes having openings formed therein for the ejection of cinders thrown out by the centrifugal force resulting from the gas flow around said strips, said vertical walls extending through said converging walls and forming a cinder hopper therebeneath and having openings at the lower ends of said converging walls for receiving cinders therefrom.

8. A combined fluid heater and cinder collector, comprising a plurality of substantially vertical outer tubes, spaced substantially vertical walls dividing said tubes into two groups, a pair of converging walls, one enclosing the lower ends of the tubes of one of said groups and the other enclosing the ends of the tubes of the other of said groups, substantially smaller inner tubes arranged substantially concentrically within said outer tubes, metal strips wound spirally around said inner tubes, means for flowing a fluid to be heated through said inner tubes, means forming a heated gas inlet passage for supplying gas through one of said converging walls into the lower ends of the tubes of one of said groups, means forming an upper passage for guiding the gas leaving the upper ends of the tubes of said group into the upper ends of the tubes of said other group, and means forming a gas outlet passage from the lower ends of the tubes of said other of said groups, the walls of said outer tubes having openings formed therein for the ejection of cinders thrown out by the centrifugal force resulting from the gas flow around said strips, said vertical walls extending through said converging walls and forming a cinder hopper there-beneath and having openings at the lower ends of said converging walls for receiving cinders therefrom.

9. A combined fluid heater and cinder collector, comprising a plurality of substantially vertical outer tubes, spaced substantially vertical walls dividing said tubes into two groups, a pair of converging walls, one enclosing the lower ends of the tubes of one of said groups and the other enclosing the ends of the tubes of the other of said groups, substantially smaller inner tubes arranged substantially concentrically within said outer tubes, metal strips wound spirally around said inner tubes, means for flowing a fluid to be heated through said inner tubes, means forming a heated gas inlet passage for supplying gas through one of said converging walls into the lower ends of the tubes of one of said groups, means forming an upper passage for guiding the gas leaving the upper ends of the tubes of said group into the upper ends of the tubes of said other group, and means forming a gas outlet passage from the lower ends of the tubes of said other of said groups, the walls of said outer tubes having openings formed therein for the ejection of cinders thrown out by the centrifugal force resulting from the gas flow around said strips, said vertical walls extending through said converging walls and forming a cinder hopper there-beneath and having openings at the lower ends of said converging walls for receiving cinders therefrom, said inner tubes having lower extensions extending through said converging walls crosswise said inlet and outlet passages.

10. A combined fluid heater and cinder collector, comprising a plurality of substantially vertical outer tubes, spaced substantially vertical walls dividing said tubes into two groups, a pair of converging walls, one enclosing the lower ends of the tubes of one of said groups and the other enclosing the ends of the tubes of the other of said groups, substantially smaller inner tubes arranged substantially concentrically within said outer tubes, metal strips wound spirally around said inner tubes, means for flowing a fluid to be heated through said inner tubes, means forming a heated gas inlet passage for supplying gas through one of said converging walls into the lower ends of the tubes of one of said groups, means forming an upper passage for guiding the gas leaving the upper ends of the tubes of said group into the upper ends of the tubes of said other group, and means forming a gas outlet passage from the lower ends of the tubes of said other of said groups, the walls of said outer tubes having openings formed therein for the ejection of cinders thrown out by the centrifugal force resulting from the gas flow around said strips, said vertical walls extending through said converging walls and forming a cinder hopper therebeneath and having openings at the lower ends of said converging walls for receiving cinders therefrom, said inner tubes having lower extensions extending through said converging walls crosswise said inlet and outlet passages and having upper extensions extending crosswise said upper passage.

11. A combined fluid heater and cinder collector, comprising a plurality of substantially parallel, horizontal fluid heater tubes, a wall dividing said tubes into upper and lower groups, substantially larger outer tubes arranged substantially concentrically around the tubes of said lower group, a cinder hopper below said outer tubes, metal strips wound spirally around the tubes of said lower group and between same and their respective outer tubes, means for flowing a fluid to be heated first through said tubes of said lower group and then through said tubes of said upper group, and means forming gas passages for flowing gas first over said tubes of said upper group and then through said outer tubes, the walls of said outer tubes having openings therein for the ejection of cinders thrown out as a result of the centrifugal force caused by the gas flow around said strips.

12. A combined fluid heater and cinder collector, comprising a plurality of substantially parallel, horizontal fluid heater tubes, a wall dividing said tubes into upper and lower groups, substantially larger outer tubes arranged substantially concentrically around the tubes of said lower group, a cinder hopper below said outer tubes, metal strips wound spirally around the tubes of said lower group and between same and their respective outer tubes, means for flowing a fluid to be heated first through said tubes of said lower group and then through said tubes of said upper group, and means forming gas passages for flowing gas first over said tubes of said upper group and then through said outer tubes, the walls of said outer tubes having openings therein for the ejection of cinders thrown out as a result of the centrifugal force caused by the gas flow around said strips, said tubes of said lower group extending substantially beyond both ends of said outer tubes into said gas passages.

13. A combined fluid heater and cinder collector, comprising a plurality of substantially parallel, horizontal fluid heater tubes, a wall dividing said tubes into upper and lower groups, substantially larger outer tubes arranged substantially concentrically around the tubes of said lower group, a cinder hopper below said outer tubes, metal strips wound spirally around the tubes of said lower group and between same and their respective outer tubes, means for flowing a fluid to be heated first through said tubes of said lower group and then through said tubes of said upper group, means forming gas passages for flowing gas first over said tubes of said upper group and then through said outer tubes, the walls of said outer tubes having openings therein for the ejection of cinders thrown out as a result of the centrifugal force caused by the gas flow around said strips, said tubes of said lower group extending substantially beyond both ends of said outer tubes into said gas passages, means forming a gas passage connecting said hopper and the gas exit passage from said outer tubes, and a damper in said last mentioned passage.

THOMAS B. ALLARDICE.